United States Patent [19]

Dickakian

[11] Patent Number: 4,600,500

[45] Date of Patent: Jul. 15, 1986

[54] WATER-SOLUBLE POLYAMINE ADDITIVE FOR REMOVAL OF SUSPENDED SOLIDS

[75] Inventor: Ghazi B. Dickakian, Kingwood, Tex.

[73] Assignee: Exxon Chemical Patents Inc., Florham Park, N.J.

[21] Appl. No.: 707,004

[22] Filed: Feb. 27, 1985

[51] Int. Cl.$^4$ ............................................. C10G 29/20
[52] U.S. Cl. .................................. 208/177; 210/708; 210/735; 252/8.55 B
[58] Field of Search ............... 208/177, 188; 210/729, 210/734, 735, 736, 728; 252/358

[56] References Cited

U.S. PATENT DOCUMENTS

| | | | |
|---|---|---|---|
| 3,391,090 | 7/1968 | Schiegg | 210/736 |
| 3,849,307 | 11/1974 | Grundner | 210/735 |
| 4,029,708 | 6/1977 | Seitz et al. | 252/358 |
| 4,326,948 | 4/1982 | Zang | 208/290 |
| 4,405,015 | 9/1983 | McCoy et al. | 208/188 |

*Primary Examiner*—Andrew H. Metz
*Assistant Examiner*—Anthony McFarlane
*Attorney, Agent, or Firm*—R. A. Dexter; R. L. Graham

[57] ABSTRACT

A process for removing suspended solids particularly difficulty filterable solids from an oil obtained as a refinery process bottom fraction from both steam and catalytic cracking units (e.g. catalytic cracker bottoms) or from coal conversion processes (e.g. coal tar) by adding to the oil a water-soluble agglomerating agent comprising an aqueous solution of a polyamine containing primary, secondary and tertiary amine functional groups with nitrogen content at least 25 wt. %.

14 Claims, No Drawings

WATER-SOLUBLE POLYAMINE ADDITIVE FOR REMOVAL OF SUSPENDED SOLIDS

FIELD OF THE INVENTION

This invention is concerned generally with the removal of suspended solids from an oil. More particularly it relates to a process for producing a solids-reduced hydrocarbon oil in which suspended solids in the oil are agglomerated by adding to the oil an agglomerating agent comprising a water-soluble polyamine and separating the agglomerated solids from the oil.

BACKGROUND OF THE INVENTION

A number of processes in petroleum production and refining, coal conversion and the chemicals industry produce as by-products liquid hydrocarbons containing insoluble solid particles oftentimes in the form of finely divided suspended inorganic or organic solids.

Among the processes which produce liquid hydrocarbons containing appreciable amounts of finely divided suspended solids are steam cracking, catalytic cracking, coal gasification, coke production, and liquification of coal and synthetic oil production shale. Steam cracking produces a steam cracking tar which contains insoluble particles of coke generally at a level of 0.001 to 5.25% with the remainder being useful heavy liquid hyrocarbons. Catalytic cracking produces cat cracker bottoms which contain catalyst fines generally at a level of 0.1 to 5.0 wt.% with the remainder being useful heavy liquid hydrocarbons. Liquefication of coal, such as by the donor solvent process as described in U.S. Pat. Nos. 4,085,031; 4,253,937; 4,048,054 and 4,045,328, produces a solvent-coal slurry containing insoluble particles. Other liquids from coal are produced in its conversion processes by, for example, in its gasification, coke preparation and other processes involving the pyrolysis of coal. These liquid hydrocarbon streams contain insoluble particles which are desirably removed or reduced in level to allow for their use as a fuel oil or as a feedstock for producing other products.

These liquid hydrocarbon streams oftentimes are routed to a settling tank wherein the solid particles (catalyst fines, coke, inorganic matter), are allowed to gravity settle over an extended period of time whereby an upper layer of substantially particle-free liquid hydrocarbons can be decanted off for product use. Settling of the particles may also be provided for in intermediate or shipping tanks. Unfortunately gravity settling is too slow for the refinery, coal conversion and chemical processes now in use.

Improved techniques which are in use include electrofiltration, filtration and centrifugal separation. The latter two approaches appear to have a low capacity or throughput and a high capital cost. Electrofiltration was handicapped by lack of a regenerable filter media which is stated to have been overcome by the use of hard, smooth spherical glass beads as taught in U.S. Pat. Nos. 3,799,855 and 3,799,856. Unfortunately these techniques are further limited since the typical oil-suspendible solids have average diameters of size below about 100 microns (commonly described in the art as difficulty filterable solids) which size makes satisfactory separation by mechanical separation techniques, including filtration, centrifugation and settling difficult to impossible.

Chemical treatments for oil containing suspended solids have been proposed in the art but, in general, each method suffers from some disadvantage as seen from the prior art discussion of U.S. Pat. No. 4,094,770 wherein the patentee has taught a process for separating suspended unfilterable particulate solids from an oil by agglomerating the solids by means of an agglomerating agent comprising a mixture of acetone and 2-butanone.

In U.S. Pat. No. 4,029,567 an agglomerating agent, especially ethanolamine is used to help separate the mineral solids and undissolved coal particles from a solution of coal liquification products.

Gravity settling can also be enhanced by the presence of a surface-active agent as taught in U.S. Pat. No. 2,952,620 wherein solid particles of a silica-alumina cracking catalyst suspended in a heavy gas oil was separated from the oil by treating the suspension with an aqueous solution of a nonionic surface-active agent e.g. a condensation product of diisobutyl phenol an 9–10 moles of ethylene oxide.

Gravity settling can be induced by use of a settling vessel in which the hydrocarbon oil containing the solids is subjected to a temperature gradient (see U.S. Pat. No. 4,048,063).

The dedusting of solids-containing hydrocarbon oils such as these derived from oil shale is accomplished by the use of various surface active agents (see U.S. Pat. No. 4,407,707).

The use of gravity settling additives and techniques have enhanced the settling rate whereby gravity settling became a feasible method fo removal of suspended solids requiring little additional capital investment, a mechanically simple operation and readily modified by change of the additive.

It is the object of this invention to enhance the gravity settling rate of suspended solids from hydrocarbon oils by use of an improved agglomeration aid alone or in combination with other additives.

SUMMARY OF THE INVENTION

It has been discovered that the residual hydrocarbon oils from petroleum and coal conversion processes, for example hydrocarbon oils boiling in the range of about 200° C. to 550° C. and containing less than 0.5 weight percent of water, can be readily reduced in solids preferably inorganic solids content to an oil having less than 500 weight parts per million (WPPM) of filterable solids when admixed with from 25 to 1000, preferably 50 to 250 ppm of a water-soluble agglomeration aid such as a polyamine, preferably in the form of an aqueous polyamine solution, at a temperature of from 35° to 210° C. and allowed to gravity settle for from 0.3 to 10 days.

In accordance with the object of this invention there is provided a process for removal of suspended solids in a hydrocarbon oil fraction comprising:

providing a hydrocarbon oil fraction having an inorganic particulate content greater than 0.02 weight percent and boiling in the range of from about 200° C. to about 550° C.;

treating said fraction with at least 10 weight parts per million of a water-soluble polyamine; and, recovering a deashed hydrocarbon oil portion having a reduced ash content of filterable solids.

The agglomeration aid is of the class of water soluble aliphatic amines containing 8 to 12 nitrogen atoms and ranging in $\overline{M}w$ from 200 to 2,000, preferably 250 to 1500, optimally 200 to 1,000.

Preferred are the ethylene polyamines and having at least one terminal primary amino group.

DETAILED DESCRIPTION OF THE INVENTION

Within the steam cracking reaction or the catalytic cracking reactor where catalysts are used, the liquid hydrocarbon feedstock is subjected to processing conditions of elevated temperature and sometimes elevated pressure to accomplish the desired cracking. The resultant effluent of the reactor is then fractionated into the fractions of gases, light liquid hydrocarbons and heavy liquid hydrocarbons, with the heaviest and highest boiling fraction being the steam cracker tar or the cat cracker bottoms predominating in alkyl substituted polycondensed aromatics which contain the insoluble particles. The coal liquification process involves contacting particulate coal with a hydrogen (e.g. a hydrogen donor solvent) under liquification conditions producing a hydrocarbon stream containing insoluble particles. The hydrocarbon steam can be fractionated to produce gases, light liquid hydrocarbons and heavy liquid hydrocarbons with the heaviest fraction being the bottoms containing the particles. Other liquids from coal are produced by coal conversion process utilizing the pyrolysis of coal.

The gasification of low-BTU coal to supply fuel gas for boilers, kilns and process furnaces was widespread until low cost natural gas became available. The natural gas curtailments in the early 1970s along with the rapid rise in natural gas prices have reawakened interest in industrial coal gasification to provide fuel gas for kiln operations, heat treating furnaces, boilers and industrial heating. The gasification process yields a hot raw producer gas which upon quenching yields varying amounts of coal tar. Since the coal tar has wide industrial applications both for tar-based chemical and pharmaceutical products and for fuels, it is highly desirable to reduce the inorganic ash content of these tars. Similarly in the production of coke, the gas derived from the carbonization of the coal into coke can contain significant amounts of coal tar which is recovered and similarly processed.

Thus, this invention broadly treats any liquid hydrocarbon stream containing insoluble solids or particles particularly fine inorganic solids and liquid hydrocarbons to remove or substantially reduce the solids content of the hydrocarbon oil and is particularly applicable to oils containing finely divided suspended solids, optimally so when these solids can be bonded together by the agglomeration aid bridging through a complexing mechanism.

Finely divided oil-suspended solids, in general, are effectively removed from the oil by the process of the invention. Those common properties which engender oil suspendability of these particles, for example particle size, density, charge and the like, are also believed to render them susceptible to effective agglomeration and removal by the present process. Representative solids include mineral ash-forming impurities, coal coke, carbonaceous solids, catalyst and spent shale fines, natural and synthetic mineral oxides, organic and inorganic salts mixtures thereof and the like in particulate form and for the unfilterable solids sized in the average diameter range below about 100 microns, especially below about 60 microns.

Representative suspended-solids-containing oils suitable for use herein include shale oil, coal liquefaction oils as from extraction, hydrogenation, thermal treatment and combinations thereof, coal tars from coke manufacture, tar sand oils, petroleum refinery, decant oils such as fractionator bottom oils from a fluid catalytic cracking process bottoms fractions of said oils, resids, mixtures thereof, and the like oils.

These hydrocarbon oils are most effectively treated by the invention when a fraction boiling in the range of 200° C. to 550° C. with a total insoluble solids content greater than about 1,000 WPPM, e.g. from 1,000 to 50,000 WPPM more normally an insoluble solids content in the range of 2,000 to 10,000 WPPM.

The Agglomeration Aid

A prime feature of the present process is the discovery of a unique solids-agglomerating agent. A solids-agglomerating agent, to be useful and effective in this service, must promote essentially complete removal of solids from an oil and at the same time must leave the oil virtually intact. In general, known solvents employed for recovering solids from an oil do not meet the latter requirement. The failure of these solvents is manifest in their inability to effectively solubilize both paraffinic-type hydrocarbons and asphaltene-type hydrocarbons. Of course it must be apparent that the most difficulty filterable solids are the inorganic particles for which the solvent approach is of no value. In addition, an appreciable portion of the oil is usually rejected (a loss to the process of desirable product precursors) in the form of tacky or flocculent solids.

It has been discovered that a water soluble polyamine having from 8 to 12 nitrogen atoms per molecule and having a $\overline{M}w$ ranging from 200 to 2,000, preferably 250 to 1,500, optimally from 250 to 1,000, when used in admixture with an inorganic solids containing hydrocarbon oil in amounts ranging from 10 to 1,000, preferably 25 to 250, ppm based on the weight of said oil markedly enhances the gravity settling of said solids so that in from 0.3 to 10 days the solids content of said oil is reduced to less than about 50 WPPM. Preferred for use as an agglomeration aid is an organic compound containing multiamine functional groups. For example, a high molecular weight polyethylene-amine with one or more of primary amine groups, secondary amine groups and tertiary amines.

Broadly speaking the water-soluble polyamine compounds useful as deashing (agglomeration) aids, uniquely for hydrocarbon oils having less than 0.5 weight percent water, have the following general characteristics of nitrogeneous functional groups:

Nitrogen content (Wt. %)=30–40
Primary amine (Wt. %)=10–15
Secondary amine (Wt. %)=10–30
Tertiary amine (Wt. %)=5–20

In the event that the solids-containing hydrocarbon contains from 0.05 to 50 weight percent or greater of water, it is useful to supplement the agglomeration aid with from 0.5 to 5 parts by weight of a water shedding additive for each part by weight of said agglomeration aid. Since the water may provoke foaming, silicone defoamants may be also added as well as other nonionic and anionic surfactants. All $\overline{M}w$ given herein are weight average molecular weights as determined by gel permeation chromatography.

Agglomeration Conditions

Agglomeration conditions for use in the process of the invention will vary depending upon such process factors as the type and solids content of the hydrocarbon oil, the size distribution of the solids, the properties of the oil being processed and the desired level of solids in the treated oils. In general, the most satisfactory process temperature will range from 35° C. to 250° C., preferably from 50° C. to 225° C. and optimally from 75° C. to 210° C. In general the process residence time required to reach the desired ash level of less than 0.05 wt. percent will range broadly from 0.3 to 10, more usually 2 to 5, days which may be shortened by means known in the art such as by electrocoalescence.

The agglomeration aid and, if desired, the supplemental additives such as a water/deshedding aid are introduced into the hydrocarbon oil stream to be treated prior to or at the point at which said stream is introduced into the top of the settling tank. The product of the process is withdrawn from a point intermediate (on the side) while the solids settle by gravity to the bottom of the tank. The flow rates and unit sizings in the process system are adjusted to provide the desired residence time in the settling tank. The settled solids in the settling tank are withdrawn generally as a sludge for direct disposal or further treatment to recover additional hydrocarbon oil.

The following examples are provided to illustrate the embodiments of the invention and are not intended to limit it in any way.

Cat cracker bottom with the following characteristics was used in the deashing experiments:

TABLE I

| Physical characteristics | |
|---|---|
| Viscosity cst at 210° F. | 8–10 |
| Ash content, wt % | 0.125 |
| Coking value (wt %) | 6.5–7.2 |
| Asphaltene (n-heptane insolubles), % | 0.5–1.5 |
| Toluene insolubles (0.35), % | 0.1–0.2 |
| Number average mol. wt. | 250–300 |
| Filterable solids (WPPM) | 1000–50,000 |
| Flash point (PM) °F. | 230 |
| B. S and W (Vol. %) | 0.1 |
| Specific gravity | 1.0802 |

The cat cracker bottoms are a residue from the catalytic cracking of gas oil fraction and is essentially composed of alkyl substituted polycondensed aromatics having a boiling range of 200° C. to 550° C. at atmospheric pressures. These aromatics of ($\overline{Mw}$) ranging from 200 to 300 are about 70 weight percent of alkyl ($C_2$–$C_{12}$) polycondensed naphthenics/aromatics and about 30 weight percent of alkyl ($C_2$–$C_{12}$) polycondensed aromatics compounds containing a thiophenic structure.

Static Gravity Settling Test

The gravity settling test used in the following examples consisting of pouring a well-mixed, heated sample of the ash-containing oil to be tested into a 250 ml graduated cylinder and placing the cylinder in an oven heated to the desired temperature (82° C.).

When additives were tested, they were added as the cylinder was filled with the oil and the cylinder inverted 25 times to insure good mixing.

After a given time from the start, a sample was withdrawn from the top of the cylinder with a pipette. Care was taken to asure that the sample was in fact, the topmost liquid in the cylinder by inserting the tip of pipette only slightly below the surface of the liquid as it was withdrawn. The sample was analyzed for inorganic ash content by known Standard method of analysis.

EXAMPLES 1, 2, 3 AND 4

Testing of water-soluble polyamine additive

The static gravity settling method was used to test the performance of water-soluble polyamine additive in the absence of water in the cat cracker bottoms as earlier described. The additive had the following characteristics:

Total nitrogen content=33 wt.%
Primary amine=16%
Secondary amine=12%
Tertiary amine=10%

The Static Gravity Settling Test (SGST) was carried out at 82° C. for 24 hours. Results of the SGST are as follows:

| Example | Ash Content of Feed (%) | Non-aqueous Polyamine Added (ppm) | Ash Content after 24 hours Settling (Wt. %) |
|---|---|---|---|
| 1 | 0.125 | — | 0.046 |
| 2 | 0.125 | 125 | 0.036 |
| 3 | 0.125 | 150 | 0.039 |
| 4 | 0.125 | 200 | 0.040 |

EXAMPLES 5,6,7 AND 8

Testing of aqueous polyamine solution

The SGST was used to evaluate an aqueous solution (66% water) of the above polyamine additive. The test was carried at 82° C. for 24 hours. Test results are as follows:

| Example | Ash Content in Feed (%) | Aqueous Polyamine Added (ppm) | Ash Content after 24 hours Settling (Wt. %) |
|---|---|---|---|
| 5 | 0.125 | — | 0.046 |
| 6 | 0.125 | 125 | 0.032 |
| 7 | 0.125 | 150 | 0.012 |
| 8 | 0.125 | 200 | 0.008 |

Above test data clearly indicates that the aqueous solution of the polyamine is a very effective deashing additive in comparison to the non-aqueous polyamine additive.

EXAMPLES 9,10,11 AND 12

Testing commercial de-ashing additive (C)

A commercial deashing additive (C) was tested using the SGST at 82° C. for 24 hours. Test results of deashing additive (C) in comparison to aqueous (66 wt.% water) polyamine additive was as follows:

| Example | Added Additive PPM | Ash Content in Feed (Wt. %) | Ash Content After 24 Hours (Wt. %) | |
|---|---|---|---|---|
| | | | Aqueous Polyamine | Commercial Additive (C) |
| 9 | nil | 0.125 | 0.046 | 0.045 |
| 10 | 125 | 0.125 | 0.032 | 0.049 |
| 11 | 150 | 0.125 | 0.012 | 0.048 |
| 12 | 200 | 0.125 | 0.008 | 0.048 |

Thus the invention as disclosed herein is particularly useful for the deashing of catalytic cracker bottoms containing small quantities of water, e.g., 0.5 to 1 weight percent and is apparent can be used as an agglomeration aid for hydrocarbon liquid streams containing more than one percent of water.

As earlier discussed, the invention arose out of the discovery that a solution of water-soluble polyamine having 8 to 12 nitrogens and containing about two-thirds of water was successful in deashing a hydrocarbon stream with little water, e.g., less than 1% and containing inorganic particulate solids.

In the event that it is desired to deash hydrocarbon streams containing substantial amounts of water such as 1 to 5 weight percent, it will be desirable to reduce the water content less than 1 percent prior to treatment according to the agglomeration process.

As will be seen from the Examples, the water soluble polyamine admixture with the solids containing stream must have at least an effective amount of water to enhance the deashing activity of the water-soluble polyamine addition. For most application, the water to polyamine weight ratio will range from 1:9 to 9:1, preferably 1:3 to 3:1, however, the ratio will vary according to the nature of the hydrocarbon stream and its water content.

What is claimed is:

1. A process for removal of the suspended solids in a hydrocarbon oil fraction comprising:
   providing a hydrocarbon oil fraction boiling in the range of from about 200° C. to about 550° C.;
   treating said hydrocarbon oil fraction with a water-soluble agglomeration aid comprising a water-soluble polyamine of $\overline{M}w$ ranging from 200 to 2000 wherein the resulting mixture contains from 10 to 1000 weight parts per million of said aid based on the total weight of said mixture and at least an amount of water sufficient to enhance the solids removal activity of the water-soluble polyamine; and,
   recovering a hydrocarbon oil bottoms portion having a reduced content of filterable solids.

2. The process according to claim 1 wherein said water-soluble polyamine has $\overline{M}w$ ranging from 250 to 1,500.

3. The process of claim 1 wherein said bottom fraction had at least 1000 weight parts per million (WPPM) of filterable solids and said recovered portion had less than 50 WPPM.

4. The process of claim 1 wherein said aid is an alkylene polyamine containing from 8 to 12 nitrogen atoms per molecule.

5. The process of claim 1 wherein said aid is polyamine aqueous solution containing water to polyamine weight ratio will range from 1:9 to 9:1.

6. The process of claim 1 wherein said treating is at a temperature of from 35° C. to 250° C. and for residence times ranging from 0.3 to 10 days.

7. The process of claim 1 wherein said fraction is a solid containing hydrocarbon residual stream from cat cracking, steam cracking or coal liquefaction.

8. The process of claim 1 wherein said water soluble polyamine has $\overline{M}w$ ranging from 200 to 1000.

9. The process of claim 1 wherein said water soluble polyamine comprises nitrogenous functional groups of:
   Nitrogen content: 30 to 40 wt. %
   Primary amine: 10 to 15 wt. %
   Secondary amine: 10 to 30 wt. % and
   Tertiary amine: 5 to 20 wt. %.

10. The process of claim 1 wherein said hydrocarbon oil fraction contains less than 0.5 weight percent water.

11. The process of claim 10 wherein said aid is an alkylene polyamine containing from 8 to 10 nitrogen atoms per molecule.

12. The process of claim 11 wherein said aid is polyamine aqueous solution containing water to polyamine weight ratio will range from 1:3 to 3:1.

13. The process of claim 10 wherein said treating is at a temperature of from 35° C. to 250° C. and for residence times ranging from 0.3 to 10 days.

14. The process of claim 10 wherein said water soluble polyamine comprises nitrogenous functional groups of:
   Nitrogen content: 30 to 40 wt. %
   Primary amine: 10 to 15 wt. %
   Secondary amine: 10 to 30 wt. % and
   Tertiary amine: 5 to 20 wt. %.

* * * * *